Inventor
WILLIAM J. TAYLOR, Jr.

Patented Sept. 12, 1939

2,172,778

UNITED STATES PATENT OFFICE 2,172,778

METHOD OF AND APPARATUS FOR GEOLOGICAL EXPLORATION

William Josiah Taylor, Jr., Shreveport, La.

Application March 1, 1937, Serial No. 128,514

11 Claims. (Cl. 175—182)

This invention relates to an improvement in the art of the exploration of the crust of the earth by a method of passing electric currents through the earth's crust by means of one or more electrodes of a certain new type in electrical contact with the earth, or by means of new and special arrangements of electrodes in electrical contact with the earth, as described hereinafter, whereby measurements may be made upon currents flowing through a definite portion, or portions, of the earth, or a flow of current through the earth between similar conductors in said new electrodes may be deflected by applying electromotive forces to other component conductors of the said electrodes.

More specifically, the invention contemplates making comparative measurements of currents directed, by my improved electrode arrangement, through the surface strata and through the deeper strata, respectively, and thus determining their relative characteristics.

A pair of special electrodes or a special configuration of electrodes is here proposed to accomplish this. Each special electrode consists of two or more electrical conductors insulated from one another, but each of the conductors in contact with the earth. The electrode-to-earth contact surface of one of them can encircle the contact surface of the others, and this type will be discussed first. The simplest example of this type of electrode consists of a rod and a tube of metal arranged concentrically with insulating material between, and "faced" at one end to provide a good surface for making contact to the ground. This "contact" end might be turned conical in form as a plumb bob or else hemispherical. The tube and rod can also be arranged eccentrically with insulating material between. A measuring arrangement is set up using these electrodes. The separate conductors of the electrodes are connected to separate electrical measuring devices and separate sources of electro-motive-force through a convenient arrangement of switches.

Measurements may be made on the potential drops, if any, and the currents flowing through the various circuits whether the currents are generated by electro-motive forces applied externally to the earth, or by electro-motive forces existing within the earth due to differences in chemical composition or porosity of the earth's materials, or by both sources of electro-motive force. When currents arise from galvanic action within the earth or from the galvanic action of earth materials in contact with the electrodes, I here propose to make use of the change in galvanic action with time by measuring the time element as well as the electrical quantities, and using the data thus obtained to correct for such galvanic action or else to use such measurements on the natural galvanic action in the earth materials as a means of determining the character and structure of said earth materials. Heretofore in the art of electrical prospecting, an effort is usually made to balance out the effects of such galvanic action within the earth and at the electrodes by reversing current flow, whereas I propose to use such phenomena to advantage in exploration, rather than take steps to eliminate said phenomena.

The exploration of a portion of the earth's crust underlying a given area as proposed herein is carried on in one of the following, or in any combination of the following, ways: by an arrangement of multiple conductor electrodes, each consisting of a plurality of mutually insulated conductors, and by passing current through all of the conductors and through the earth's crust, and comparing the values of the portions of the currents which travel deeper and deeper; by an arrangement of multiple conductor electrodes and accompanying measuring devices, and sources of electromotive force which are moved from one location to another and reassembled with the same spacing of the electrodes and the same connection of the external circuits used at an earlier location; by a similar arrangement wherein one electrode remains fixed and the other one moved in such a way that the distance between the electrodes is increased between successive readings, whereby the currents reach greater and greater depths in their passage through the earth.

By the aforesaid means of exploring the crust of the earth by means of electric currents, enough observations may be made to determine the desired properties or anomalies sought for in the earth's crust, whether in structure or in material.

In order that the invention may be readily understood, reference is had to the accompanying drawings, forming part of this specification and in which.

Figure 3:
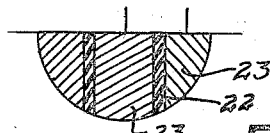
Fig. 3 shows, in vertical section and plan, one form of my improved multiple conductor electrode.

Referring to the drawings in detail and more particularly first to Fig. 3 thereof, the novel electrode there illustrated comprises a composite block of hemispherical shape comprising a central conductor and a concentrically arranged annular conductor, separated by insulating material. The convex or spherical surface of this electrode is designed to be placed in contact with the earth, and separate wires are connected to the two conducting portions as shown.

Figure 4:
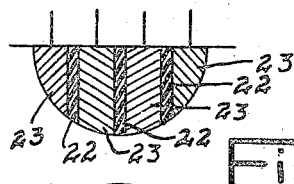
Fig. 4 shows in vertical section and perspective another form of my improved multiple conductor electrode.

Fig. 4 shows a further development or carrying forward of the same idea. In this form, there is provided a composite electrode consisting of a central and three concentric annular conducting portions of progressively increasing size, all of said conducting portions being separated from each other by insulating material, and separate wires being connected with the four conducting portions. One composite electrode of the form shown in Fig. 3 is illustrated at 14 in the diagram of Fig. 1, while two multiple conductor or composite electrodes of the form shown in Fig. 4 are illustrated at 5 in the diagram of Fig. 2.

Figure 2:
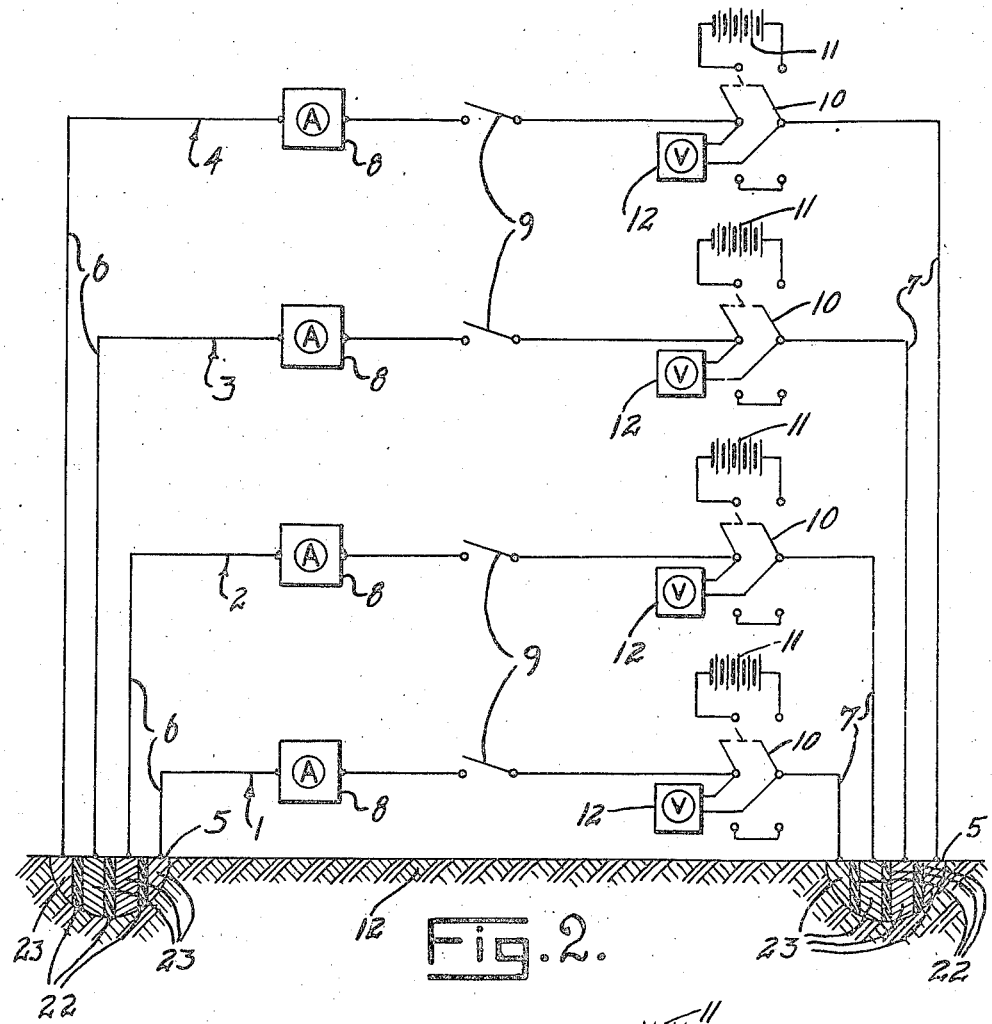
Fig. 2 is a similar diagram showing another and more complex arrangement of apparatus embodying the invention.
Figure 1:
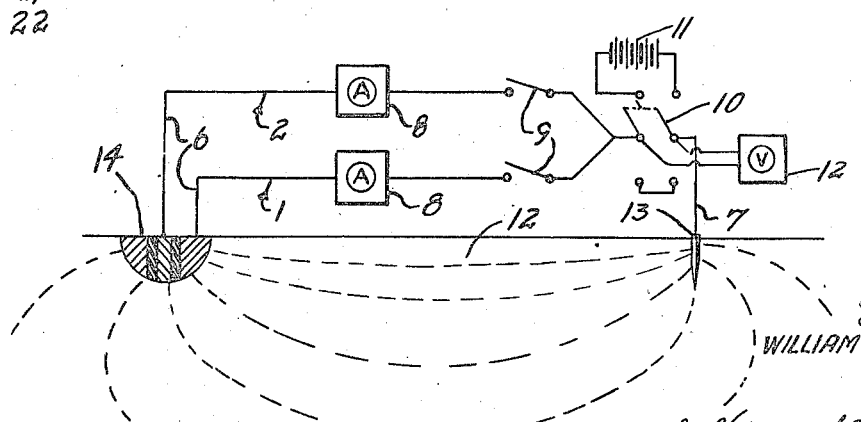
Fig. 1 is a diagram illustrating the principles involved in the present invention, in its simplest form.

Similar numbers refer to similar parts and devices throughout the Figures 1 and 2, illustrating the two disclosed forms of the invention.

Figure 7:
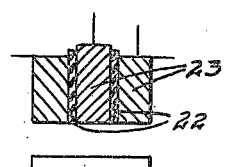
Figure 8:
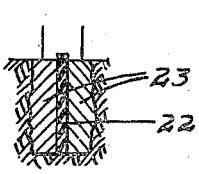

Circuits external to the earth are designated by numbers 1, 2, 3 and 4. 6,6 are insulated conductors of electricity connecting conductors in a multi-conductor electrode 5, or 14 to current measuring devices 8,8. In Figures 1 and 2, 7,7 are an insulated conductor or conductors of electricity connecting an electrode 5 or 13 to a single source 11, or to a number of separate sources of electromotive force 11,11; 9,9 represent single pole switches, or single pole push button switches, and 10,10 represent double pole double throw switches. 12,12 are devices for measuring or registering potential difference. 8,8 are current measuring devices or registering devices having suitable means for measuring or registering the time elapsed after closing the switches 9,9. 8,8 can be registering elements in an oscillograph having suitable means for measuring or registering time intervals or 8,8 can be current measuring devices such as ammeters and used when convenient or necessary in conjunction with some form of chronometrically registering or measuring device such as a stop-watch, or metronome. These examples given here do not limit the devices to the specific forms of oscillograph, ammeter, stop-watch, or metronome. 11,11 are sources of electromotive force which may be constant or which may vary with time in any manner necessary to the successful execution of the method in the particular area being explored, i. e., the electromotive force may have any waveform such as square, damped or undamped sinusoidal, intermittent or interrupted. 12 represents earth or water, or earth covered by water. The electrodes can be imbedded in water if the measuring instruments are out of the water. 13 is an electrode of any convenient shape, and can consist of a piece of metal or a porous pot containing an electrolyte. In all of the figures insulating materials are designated by the numbers 22, and electrically conducting materials by 23.

The present invention is not limited to geological exploration with the particular forms of apparatus disclosed in Figs. 1 and 2. In Fig. 1, a composite electrode comprising two conductors is illustrated, while in Fig. 2, an electrode having four conductors is shown. The invention is, however, not limited to any particular number of conductors in the composite electrode, provided that there are more than one such conductor. Aside from a difference in the number of branch circuits and of component conductors of the multiple-conductor electrodes, the forms of the measuring devices disclosed in Figures 1 and 2 differ from each other in that the second form of the two has a separate source of electromotive force for each branch circuit and component conductor of the pair of multiple conductor electrodes 5,5, whereas the first form has an electromotive force and external wire 7 and simple electrode 13 common to the currents which flow through both conductors of the two conductor electrode 14.

Referring to Fig. 1, the paths of the current through the earth are indicated by dotted lines, and it will be seen that the current from the outer or annular conductor of the composite electrode 14 flows along a path of roughly annular cross section and flows through the upper strata nearer the surface of the earth as well as through the very deep strata, while the current from the central conductor of the electrode tends to flow down into and through strata deeper than the shallow strata above referred to but not so deep as the deeper strata mentioned. The path of this last mentioned current it will be seen is substantially enclosed by the roughly annular path of the first mentioned current and the current flowing in said annular path from the annular conductor serves to deflect or confine the current flowing from the central conductor and force it to seek a path through the strata surrounded by said annular path. The current through the central conductor can thus be confined to a more or less definite path at a substantially predetermined depth. By measuring the current flowing through each conductor of the composite electrode and comparing the values of such currents, the relative conductivity of the strata at different depths can be ascertained and the characteristics of the different strata as regards content of minerals or other material whose conductivity is either greater or less than that of normal earth, may be determined. The arrangement in Fig. 2 is substantially similar except that as above mentioned separate sources of electromotive force are indicated, and instead of a composite electrode and a simple electrode as shown in Fig. 1, two composite electrodes, each comprising four conductors, are employed. Aside from the difference in the number of branch circuits and of conductors, the two disclosed arrangements in Figures 1 and 2 are equivalent in their characteristics and operation so long as only entirely homogeneous or perfectly horizontally stratified earth is explored. If there is a lack of symmetry in the composition of the earth with respect to a plane which is the perpendicular bisector of the line connecting 13 and 14, the two arrangements or forms will give different results. Because of this it has proved beneficial to use sometimes one and sometimes the other form of the apparatus in conducting explorations. Wherefore the form can not be limited to either type nor, on the other hand, can the two forms be called entirely equivalent. A form similar to that disclosed in Figure 1 is used when it is desired to search for anti-symmetrical conditions in the composition of the crust of the earth. When outcrops occur frequently or other lack of symmetry occurs locally and particularly near the surface of the earth, it is often necessary to use a form of the general type disclosed in Figure 2, that is, an arrangement consisting of two similar multiple conductor electrodes, and entirely separate external branch circuits and electromotive forces connected to each conductor of said multiple conductor electrodes.

Figure 5:
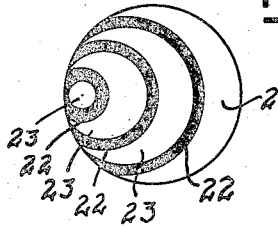
Figs. 5, 6, 7 and 8 are views showing in vertical section and in plan four other modified forms of electrode.
Figure 5:
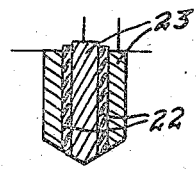
Figure 6:
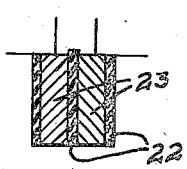

In Figs. 5, 6, 7 and 8, other forms of composite electrodes are illustrated, each of these being two conductor electrodes like that shown in Fig. 3. In Fig. 5, however, the end of the composite electrode which engages the ground is shown as conical instead of hemispherical, while in the other three figures the lower end or face of the electrode is shown as flat. Any of these forms may be used in place of that shown in Fig. 3, if desired.

Figure 9:
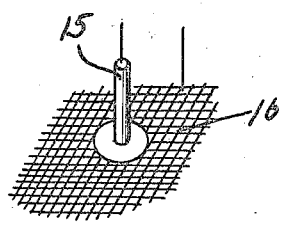
Fig. 9 is a perspective view illustrating still another arrangement of multiple conductor electrode which I may employ.

In Fig. 9, I have illustrated a composite electrode arrangement consisting of a central conductor 15 such as a rod or tube, driven into the ground and surrounded by a piece of wire netting 16 or the like, engaging the surface of the ground and having a hole through which the rod 15 passes in spaced relation from the netting. The effect of this composite electrode on the distribution of current in the earth's strata is similar to that of the electrode shown in Fig. 3.

Figure 10:
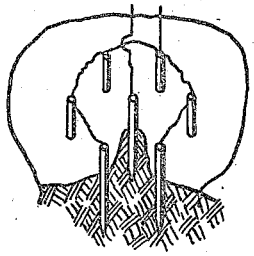
Figs. 10 and 11 are perspective views illustrating special arrangements of groups of separate electrodes, by means of which the invention may be carried out.
Figure 11:
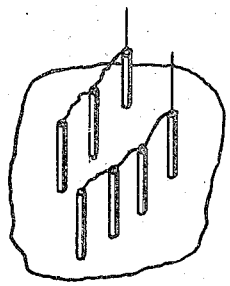

In Figs. 10 and 11, I have shown methods of producing the same results by means of a plurality of separate conductors spaced apart and driven into the ground. This arrangement has the advantage that the separate electrodes of the group may be separated considerable distances if desired. In Fig. 10, I have shown a central conductor surrounded by a group of similar conductors electrically united, and so connected that comparative readings may be taken of the current flowing through the central electrode and through the surrounding group as a suit. In Fig. 11, I have shown a composite electrode formed of two groups of spaced conductors disposed in more or less parallel lines, spaced apart as desired, comparative readings being taken of the current flowing through each group as a unit.

I claim:

1. Apparatus for electrically exploring the earth's crust comprising a pair of earth contacting means located one at each of the two separated geographical stations, at least one of said means comprising a plurality of conductors spaced from each other, a circuit extending from each of said conductors at one station to the earth contacting means at the other station, separate current measuring means in each of said circuits, and means for generating an electromotive force in the same direction in each of said circuits.

2. Apparatus for electrically exploring the earth's crust comprising a pair of earth contacting means located one at each of two separated geographical stations, at least one of said means comprising a plurality of conductors spaced from each other, a circuit extending from each of said conductors at one station to the earth contacting means at the other station, means for causing current to flow in all of said circuits in the same direction, and means for independently measuring the amount of current flowing in each circuit.

3. Apparatus as in claim 1, in which there is a common circuit extending between stations and containing a source of electromotive force, said common circuit having a plurality of branches, each branch being connected with one of said conductors and containing a separate current measuring means.

4. Apparatus as in claim 1 in which there are a plurality of earth contacting conductors at each station, and in which a separate circuit, each containing a source of electromotive force and a current measuring instrument, connects corresponding conductors at the respective stations.

5. In apparatus for electrically exploring the earth's crust, earth contacting means comprising a central conductor, and conducting means surrounding and spaced from said central conductor.

6. In apparatus for electrically exploring the earth's crust, a composite contact electrode comprising a central conductor and an outer conductor surrounding and insulated from said central conductor.

7. In apparatus for electrically exploring the earth's crust, a composite contact electrode comprising a central conductor and an outer conductor surrounding and insulated from said central conductor, the end of said electrode being in the form of a solid of revolution, whereby, when said electrode is introduced into the earth's surface, said central conductor extends deeper than said outer conductor.

8. In apparatus for electrically exploring the earth's crust, a composite contact electrode comprising a plurality of conductors spaced apart and engaging the earth, said conductors being otherwise insulated from each other, one of said conductors, when the electrode is in use, extending more deeply into the earth than the other.

9. The method of electrically exploring the earth's crust which comprises causing current to flow through the earth between a plurality of associated conductors at one geographical station and an electrode at another geographical station, and separately measuring the value of the portions of such current flowing through each of said conductors.

10. The method of electrically exploring the earth's crust which comprises causing current to flow through the earth between an electrode at one station and a plurality of conductors contacting the earth at different depths at another station, and determining the relative value of the portions of such current flowing through the respective conductors.

11. The method of electrically exploring the earth's crust which comprises causing current to flow through the earth between grounded conductors at separated stations, and deflecting such current from its normal path by causing another current to flow through the earth between substantially the same stations in the same direction.

WILLIAM JOSIAH TAYLOR, JUNIOR.